United States Patent [19]

Sol

[11] Patent Number: 5,043,896
[45] Date of Patent: Aug. 27, 1991

[54] VEHICLE BRAKING SYSTEM CONTROLLER/ROAD FRICTION AND HILL SLOPE TRACKING SYSTEM

[75] Inventor: David Sol, Dearborn, Mich.

[73] Assignee: Ford Motor Company, Dearborn, Mich.

[21] Appl. No.: 535,938

[22] Filed: Jun. 11, 1990

[51] Int. Cl.⁵ .............................................. B60T 8/32
[52] U.S. Cl. ........................ 364/426.02; 364/426.03; 180/197; 303/95
[58] Field of Search .................. 364/426.01, 426.02, 364/426.03; 303/97, 99, 95; 180/197

[56] References Cited

U.S. PATENT DOCUMENTS

| | | | |
|---|---|---|---|
| 4,188,075 | 2/1980 | Rajput et al. | 303/106 |
| 4,384,330 | 5/1983 | Matsuda et al. | 364/426.03 |
| 4,562,542 | 12/1985 | Skarvada | 364/426.02 |
| 4,665,490 | 5/1987 | Masaki et al. | 364/426.02 |
| 4,666,218 | 5/1987 | Masaki et al. | 303/106 |
| 4,745,995 | 5/1988 | Wupper | 188/181 A |
| 4,755,945 | 7/1988 | Kade et al. | 364/426.02 |
| 4,760,893 | 8/1988 | Sigl et al. | 364/426.03 |
| 4,763,260 | 8/1988 | Sakuma et al. | 364/426.02 |
| 4,783,126 | 11/1988 | Arikawa | 303/96 |
| 4,793,662 | 12/1988 | Arikawa | 303/96 |
| 4,818,037 | 4/1989 | McEnnan | 307/97 |
| 4,829,438 | 5/1989 | Etoh | 364/426.04 |
| 4,836,619 | 6/1989 | Muto | 303/109 |
| 4,842,342 | 6/1989 | Takahashi et al. | 303/102 |
| 4,855,917 | 8/1989 | Sawano et al. | 303/97 |
| 4,947,332 | 8/1990 | Ghoneim | 303/97 |

Primary Examiner—Gary Chin
Attorney, Agent, or Firm—Allan J. Lippa; Roger L. May

[57] ABSTRACT

A method and system for controlling a vehicle braking system on slippery surfaces and hills uses estimates of external conditions from vehicle and engine measurements in a feedforward manner to control vehicle brake pressure on slippery or changing surfaces and hills to compensate for external disturbances in an optimal manner. The present invention provides a dual feedforward/feedback system for and method of controlling vehicle braking. The method includes the step of generating a first disturbance value related to the slope of a hill and a second disturbance value related to the coefficient of friction of the road surface. The first and second disturbance values are then summed to generate a feedforward control value for controlling the level of vehicle braking. The system for controlling vehicle braking includes a first disturbance value related to the slope of a hill and a second disturbance value related to the coefficient of friction of the road surface. The first and second disturbance values are summed to generate a feedforward control value for controlling the level of vehicle braking.

17 Claims, 2 Drawing Sheets

VEHICLE BRAKING SYSTEM CONTROLLER/ROAD FRICTION AND HILL SLOPE TRACKING SYSTEM

BACKGROUND OF THE INVENTION

The present invention relates generally to vehicle brake control and, more particularly, to a system for and a method of controlling longitudinal vehicle braking on slippery surfaces and inclines.

It is well known in the industry that optimum vehicle brake pressure is heavily dependent on road surface conditions, among other factors. However, the ever-changing road surface conditions are almost impossible to continuously monitor and measure, and even harder to apply to vehicle control systems which adjust vehicle braking and traction. Consequently, vehicle braking control devices typically adjust braking based on arbitrary fixed targets which, since fixed, are at best a compromise for braking control on the various driving surfaces such as loose snow, packed snow, rain, wet leaves, and dry pavement.

An example of a typical brake control system is disclosed in U.S. Pat. No. 4,763,260 issued to Sakuma et al. The Sakuma et al reference discloses a brake control system which provides an empirical estimation of the road surface coefficient of friction. The estimations and calculations of Sakuma et al assume uniform, unchanging, flat road surface conditions. However, the changing grades and conditions of a road surface have a direct impact on the braking efficiency.

Another reference, U.S. Pat. No. 4,188,075 issued to Rajput et al, discloses an acceleration system for anti skid brake control systems which controls the amount of air pressure being delivered to the vehicle brake system. The adaptive acceleration system adapts to the coefficient of friction between the road surface and tires of a vehicle to provide variable control of the reapplication of brake pressure during spin up or acceleration of the wheels, such as after a skid has occurred.

In a co-pending, commonly assigned patent, Ser. No. 07/535,678, filed June 11, 1990, external changes are estimated and made available to a variety of control devices in a vehicle. The estimating device estimates external conditions, most notably the coefficient of friction between a vehicle tire and a roadway, and the slope or grade of the hill the vehicle is attempting to climb or descend. From values of driven wheel spin of the vehicle, non-driven wheel spin of the vehicle, brake pressure, and wheel torque, the estimating device infers the value of the coefficient of friction and the hill slope. Instead of being imbedded in a brake control device or a traction control device, the estimator is a separate device which is capable of providing the determined values to a variety of vehicle control applications.

It is seen then that there is a need for a device which can utilize estimated external values of the coefficient of friction and hill slope in a feedforward manner to control vehicle braking on slippery or changing surfaces and hills to compensate for external disturbances in an optimal manner.

SUMMARY OF THE INVENTION

The present invention meets this need by providing a dual feedforward/feedback system for and method of controlling vehicle braking on slippery surfaces and inclines which compensates for external or environmental disturbances. The invention allows for the optimization of longitudinal vehicle deceleration by regulating wheel spins to the optimum safe value for any road condition in accordance with road surface changes such as slippery conditions and hills.

In one embodiment of the present invention, a brake pressure control method for a vehicle being driven on a road surface comprises the steps of: generating a first disturbance value related to the slope of a hill; generating a second disturbance value related to the coefficient of friction of the road surface; generating reference feedforward values; summing the first and second disturbance values and said reference feedforward values to generate a feedforward control value; generating error values; summing said feedforward control value and said error values to generate an optimum brake pressure value; and controlling the level of vehicle braking in response to the optimum brake pressure value to regulate tire skid.

An advantage of the above method is that vehicle longitudinal braking is controlled by compensating for external environmental disturbances, such as road friction and hill slope. This allows for the optimization of vehicle deceleration by controlling the amount of wheel spin to the optimum safe value for any road condition. In addition, the present invention is particularly advantageous for controlling brake pressure on slippery surfaces or inclines, as well as on changing road surfaces.

In a further aspect of the method of the present invention, the brake pressure control method comprises the steps of measuring a variety of vehicle and engine parameters including: vehicle brake pressure to generate a first feedback signal; wheel spin error of driven wheel to generate a second feedback signal; and driven wheel speed to generate a third feedback signal. The method includes the additional steps of: determining reference signals for generating a reference brake pressure feedforward value, a reference wheel spin feedforward value, and a reference driven wheel spin feedforward value; estimating a coefficient of friction of the road surface signal; estimating a hill slope of the road surface signal; summing the reference feedforward values, the coefficient of friction of the road surface signal, and the hill slope of the road surface signal to generate a first feedforward value; summing the first feedback signal and the reference brake pressure signal and applying the sum to a first gain to generate a brake pressure error value; summing the second feedback signal and the reference wheel spin error signal and applying the sum to a second gain to generate a wheel spin error value; summing the third feedback signal and the reference driven wheel speed signal and applying the sum to a third gain to generate a driven wheel speed error value; summing the error values and the first feedforward value to generate an optimum brake pressure value; and controlling the level of vehicle brake pressure in response to the optimum brake pressure value to regulate tire skid.

An advantage of this aspect of the invention is the tracking feature which tracks external conditions to provide optimum braking for any road condition. The external environmental disturbances are estimated and used to modify the brake pressure control action, instead of controlling the compromise of an arbitrary degree of skidding.

The present invention also provides a system for controlling the brake pressure of a vehicle comprising: means for generating a first disturbance value related to the slope of a hill; means for generating a second disturbance value related to the coefficient of friction of the road surface; means for generating reference feedforward gains; means for summing the first and second disturbance values and the reference feedforward gains to generate a feedforward control value; means for generating error values; means for summing said feedforward control value and said error values to generate an optimum brake pressure value; and means for controlling the level of vehicle braking in response to the optimum brake pressure value.

In a further aspect of the invention, the brake control system comprises: means for measuring vehicle conditions to generate a first feedback signal, a second feedback signal, and a third feedback signal; means for determining reference signals for generating a reference brake pressure feedforward value, a reference wheel spin feedforward value, and a reference driven wheel spin feedforward value; means for estimating a coefficient of friction of the road surface signal; means for estimating a hill slope of the road surface signal; means for summing the reference feedforward values, the coefficient of friction of the road surface signal, and the hill slope of the road surface signal to generate a first feedforward value; means for summing the first feedback signal and the reference vehicle brake pressure signal to generate a brake pressure error value; means for summing the second feedback signal and the reference wheel spin error signal to generate a wheel spin error value; means for summing the third feedback signal and the reference driven wheel speed error signal to generate a driven wheel speed error value; means for summing the error values and the first feedforward value to generate an optimum brake pressure value; and means for controlling the level of vehicle braking in response to the optimum brake pressure value to regulate tire skid.

An advantage of the brake pressure control system of the present invention is that it can utilize estimated external values of the coefficient of friction and hill slope in a feed forward manner to optimally control vehicle braking on slippery or changing surfaces and hills to compensate for external disturbances in an optimal manner.

Other objects and advantages of the invention will be apparent from the following description, the accompanying drawings and the appended claims.

DESCRIPTION OF THE PREFERRED EMBODIMENT

Figure 1:
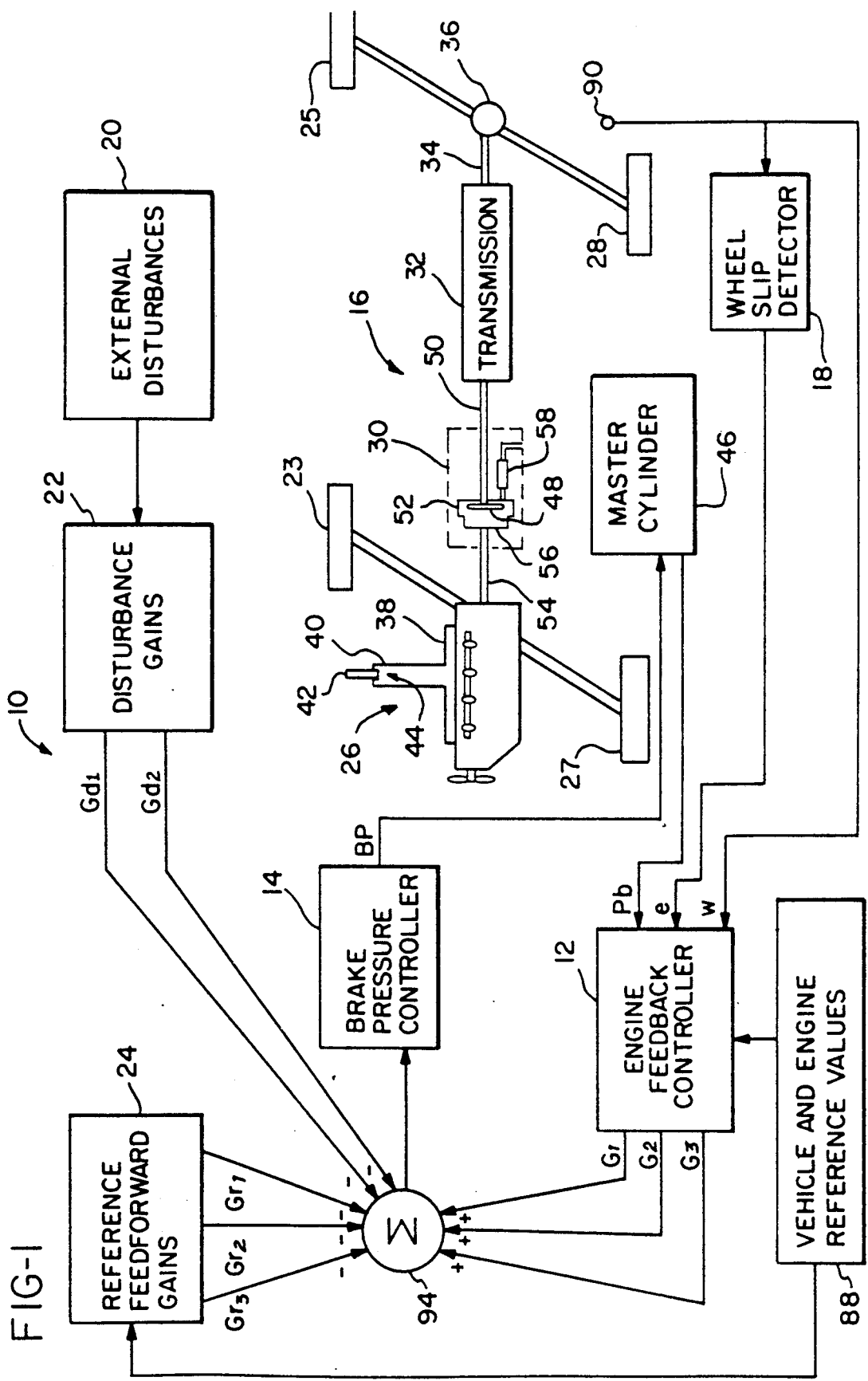
FIG. 1 is a schematic showing a conventional motor vehicle utilizing the brake pressure control system described herein.

Referring first to FIG. 1, reference number 10 generally refers to a schematic of a motor vehicle controlled by the vehicle anti-lock braking control system described herein. In general terms which are described in greater detail hereinafter, engine feedback controller 12 and brake pressure controller 14 are shown as feedback control systems receiving inputs from, and controlling motor vehicle 16 when detected wheel slip at wheel slip detector 18 indicates that the wheel slip error and, hence, the brake pressure, are not at optimum values, as determined by external disturbances 20. Disturbance gains 22 and reference feedforward gains 24 are used to compensate for or counteract these external disturbances 20, such as variations in hill slope and road surface coefficient of friction, in a feedforward manner. In this way, the optimal vehicle brake pressure can be anticipated and controlled for any road condition by compensating for external or environmental disturbances 20.

Motor vehicle 16 is shown in this particular example as having four wheels, 23, 25, 27, and 28, and an internal combustion engine 26 coupled to drive wheel 28 via clutch 30, automatic transmission 32, driveshaft 34, and differential/axle 36. Engine 26 is shown in this example as including an intake manifold 38 for inducting an air/fuel mixture therein via air/fuel intake 40. Fuel injector 42, shown as a portion of a central fuel injected system in this example, injects fuel into air/fuel intake 40. Throttle plate 44 is shown here for adjusting flow through the air/fuel intake 40 in a conventional manner. Similarly, master cylinder 46 is shown for adjusting the brake pressure of the vehicle in a conventional manner.

It is to be understood that the brake pressure control system described herein may be used to advantage with any type of combustion engine such as, for example, carbureted engines, multiport fuel injected engines, and direct fuel injected engines. Further, the brake pressure control system is not limited to automobiles, but may be used to advantage with any apparatus having an engine coupled to a drive wheel.

Continuing with FIG. 1, clutch 30 is shown including clutch plates 48 coupled to transmission shaft 50, and friction elements 52 operably coupled to engine shaft 54 via clutch housing 56. Hydraulic piston 58 is shown coupled to friction elements 52 for coupling and decoupling clutch plates 48 to friction elements 52, thereby coupling and decoupling engine 26 to transmission 32. The amount of torque coupled from engine 26 to transmission 32 is controlled by slippage of clutch 30.

Figure 2:
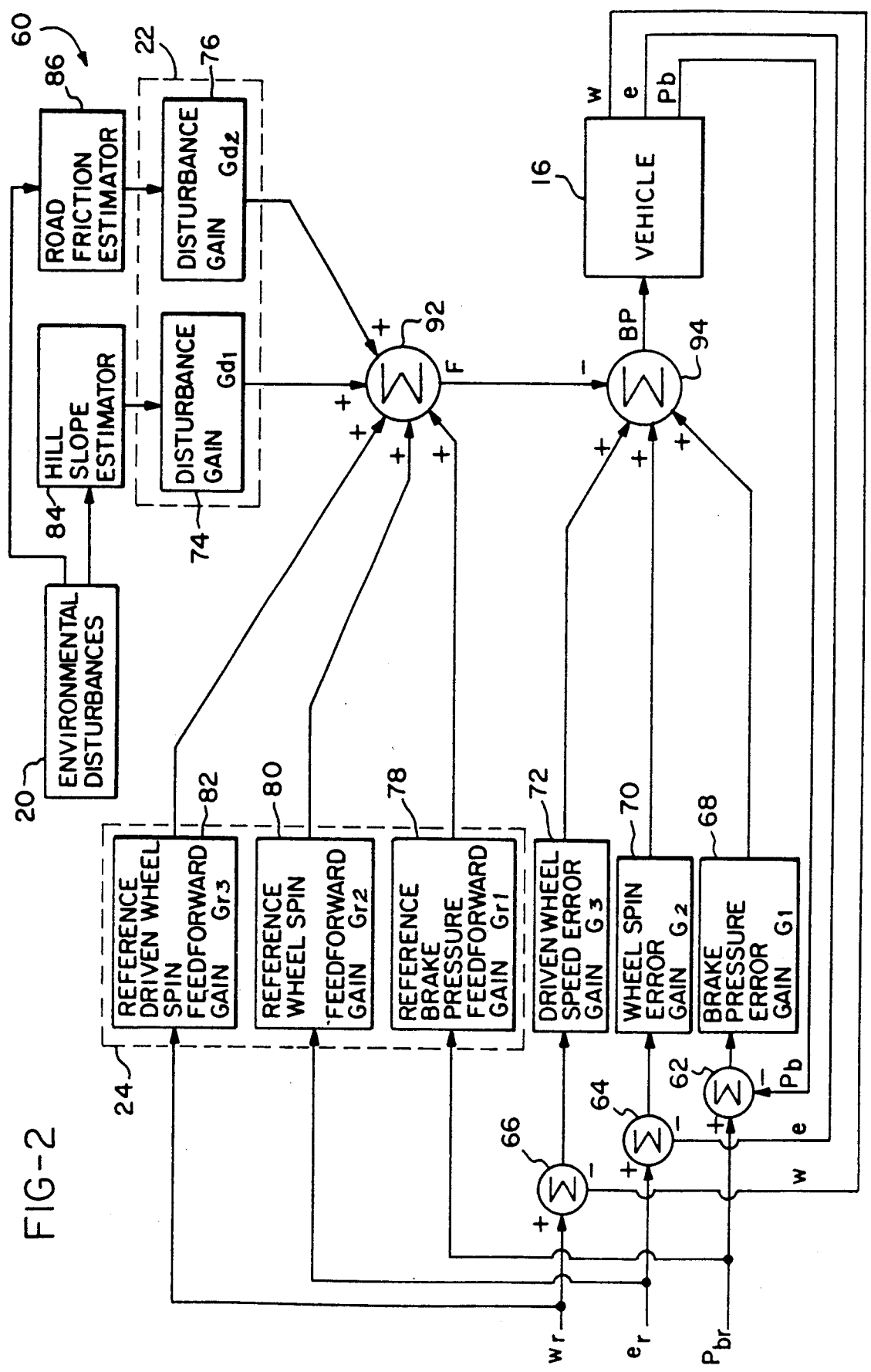
FIG. 2 is an electrical block diagram of the brake pressure control system shown in FIG. 1.

Referring now to FIG. 2, and continuing with FIG. 1, brake pressure control system 60 is shown schematically as a block diagram of computational and measurement steps represented as blocks. Each block shown herein describes an operation or step performed by the brake pressure control system 60. It is noted that these operations may also be performed by discrete components wherein each block comprises an array of circuits such as, for example, integrated circuit adders and multipliers.

The block diagram of FIG. 2 illustrates a method of controlling vehicle brake pressure on slippery surfaces and hills. Vehicle measurements of brake pressure, wheel slip error of the driven wheel 28, and driven wheel speed are compared to reference values of brake pressure, wheel slip error of the driven wheel 28, and driven wheel speed, respectively, at summers 62, 64, and 66, respectively, and then used in conjunction with feedback gains $G_1$, $G_2$, and $G_3$ at blocks 68, 70, and 72, respectively, to generate error values. Additionally, disturbance values 74 and 76 are determined by multiplying disturbance signals Alpha and Mu from blocks 84 and 86 by gains $Gd_1$ and $Gd_2$, respectively. Finally, feedforward gains $Gr_1$, $Gr_2$, and $Gr_3$ are multiplied by reference signals at blocks 78, 80, and 82, respectively.

Using estimates of external environmental conditions, such as a first disturbance signal for hill slope at block 84 and a second disturbance signal for road surface coefficient of friction at block 86, the values 74, 76, 78, 80, and 82 are used to counteract or compensate for the external disturbance signals at blocks 84 and 86, in a feedforward manner. The hill slope estimator 84 and the road surface coefficient of friction estimator 86 are shown and described in more detail in commonly assigned U.S. patent application, Ser. No. 07/535,678, filed June 11, 1990 the specification of which is hereby incorporated by reference.

Continuing with FIGS. 1 and 2, measurements of the vehicle brake pressure Pb, the wheel slip error e of the driven wheel 28, and the driven wheel speed w are applied to the engine feedback controller 12 as a first feedback signal, a second feedback signal, and a third feedback signal, respectively. In addition, predetermined reference signals $p_{br}$, $e_r$, and $w_r$, from vehicle and engine reference values block 88 of FIG. 1, are provided to both the engine feedback controller 12 and the reference feedforward gain block 24.

In a preferred embodiment of the present invention, the first feedback signal, vehicle brake pressure Pb, is determined from the master cylinder 46. The wheel slip error e, which is the second feedback signal, is determined by providing the driven wheel speed signal w to the wheel slip detector 18. Finally, the third feedback signal, driven wheel speed w, is determined directly from the driven wheel sensor 90. The negative of the measured signals Pb, e, and w are then summed with the reference signals $Pb_r$, $e_r$, and $w_r$ at summers 62, 64, and 66, respectively, and multiplied by a first gain $G_1$, a second gain $G_2$, and a third gain $G_3$ at blocks 68, 70, and 72, respectively, to provide feedback error values.

The predetermined reference signals $Pb_r$, $e_r$, and $w_r$ are also used to determine the reference feedforward values by multiplying the reference signals by gains $Gr_1$, $Gr_2$, and $Gr_3$, at blocks 78, 80 and 82, respectively. The feedforward values are then summed at summer 92 with the disturbance values from blocks 74 and 76. The negative of the resulting value is then added to the error values at summer 94 to provide an optimum brake pressure value BP.

The first summer 92 sums the reference brake pressure feedforward value at block 78, the reference wheel spin feedforward value at block 80, the reference driven wheel spin feedforward value at block 82, the hill slope signal from block 84, and the coefficient of friction signal from block 86, to generate a first feedforward value F. The second, third, and fourth summers, 62, 64, and 66, respectively, are used to generate the error values at blocks 68, 70, and 72, respectively. These error values are then applied to the fifth summer 94 where they are summed with the feedforward value F to generate an optimum brake pressure value BP. The vehicle brake pressure can then be controlled in response to the optimum brake pressure value BP.

The brake pressure control system 60 uses vehicle measurements to calculate feedback signals and uses reference signals to provide feedforward values. The system is responsive to estimated external conditions in order to optimally control vehicle braking on slippery surfaces and inclines. Disturbance values and reference feedforward values are then used to counteract or compensate for these external conditions in a feedforward manner.

Having described the invention in detail and by way of reference to preferred embodiments thereof, it will be apparent that other modifications and variations are possible without departing from the scope of the invention defined in the appended claims.

What is claimed is:

1. A brake pressure control method for a vehicle having an engine, wheels, an axle, a throttle, and brakes, the vehicle being driven on a road surface having a coefficient of friction and at least one hill slope, the method comprising the steps of:
    generating a first disturbance value related to the slope of the hill;
    generating a second disturbance value related to the coefficient of friction of the road surface;
    summing said first and second disturbance values to generate a feedforward control value; and
    controlling the level of vehicle braking in response to said feedforward control value to regulate tire skid.

2. A brake pressure control method as claimed in claim 1 wherein said first disturbance value is determined by a hill slope estimator.

3. A brake pressure control method as claimed in claim 1 wherein said second disturbance value is determined by a road surface coefficient of friction estimator.

4. A brake pressure control method for a vehicle having an engine, wheels, an axle, a throttle, and brakes, the vehicle being driven on a road surface having a coefficient of friction and at least one hill slope, the method comprising the steps of:
    generating a first disturbance value related to the slope of a hill;
    generating a second disturbance value related to the coefficient of friction of the road surface;
    generating reference feedforward gains;
    summing said first and second disturbance values and said reference feedforward gains to generate a feedforward control value;
    generating error values relating to driven wheel speed, wheel spin, and brake pressure;
    summing said feedforward control value and said error values to generate an optimum brake pressure value; and
    controlling the level of vehicle braking in response to said optimum brake pressure value.

5. A brake pressure control method for a vehicle having an engine, wheels, an axle, a throttle, and brakes, the vehicle being driven on a road surface having a coefficient of friction and at least one hill slope, the method comprising the steps of:
    measuring vehicle brake pressure to generate a first feedback signal;
    measuring wheel spin error of driven wheel to generate a second feedback signal;
    measuring driven wheel speed to generate a third feedback signal;
    determining a reference vehicle brake pressure signal for generating a reference brake pressure feedforward value;
    determining a reference wheel spin error signal to generate a reference wheel spin feedforward value;
    determining a reference driven wheel speed signal to generate a reference driven wheel spin feedforward value;
    estimating a hill slope of the road surface from a first disturbance signal to generate a first disturbance value;
    estimating a coefficient of friction of the road surface value from a second disturbance signal to generate a second disturbance value;
    summing said reference brake pressure feedforward value, said reference wheel spin feedforward value, said reference driven wheel spin feedforward value, said first disturbance value, and said second disturbance value, to generate a first feedforward value;

summing said first feedback signal and said reference vehicle brake pressure signal to produce a first sum and applying the first sum to a first gain to generate a brake pressure error value;

summing said second feedback signal and said reference wheel spin error signal to produce a second sum and applying the second sum to a second gain to generate a wheel spin error value;

summing said third feedback signal and said reference driven wheel speed signal to produce a third sum and applying the third sum to a third gain to generate a driven wheel speed error value;

summing said brake pressure error value, said wheel spin error value, said driven wheel speed error value, and said first feedforward value to generate an optimum brake pressure value; and controlling the level of vehicle braking in response to said optimum brake pressure value.

6. A brake pressure control method as claimed in claim 5 wherein said step of measuring vehicle brake pressure further includes the step of providing a master cylinder for determining said vehicle brake pressure.

7. A brake pressure control method as claimed in claim 5 wherein said step of measuring the wheel spin error further includes the step of providing a wheel slip detector to determine wheel spin.

8. A brake pressure control method as claimed in claim 5 wherein said step of measuring the driven wheel speed further includes the step of providing a driven wheel speed sensor to determine said driven wheel speed.

9. A brake pressure control method for a vehicle having an engine, wheels, an axle, a throttle, and brakes, the vehicle being driven on a road surface having a coefficient of friction and at least one hill slope, the method comprising the steps of:

measuring vehicle brake pressure, to generate a first feedback signal $Pb$;

measuring wheel spin error of driven wheel to generate a second feedback signal $e$;

measuring driven wheel speed to generate a third feedback signal $w$; determining a reference vehicle brake pressure signal $Pb_r$ for generating a reference brake pressure feedforward value;

determining a reference wheel spin error signal $e_r$ for generating a reference wheel spin feedforward value;

determining a reference driven wheel speed signal $w_r$ for generating a reference driven wheel spin feedforward value;

estimating a hill slope of the road surface signal, Alpha;

estimating a coefficient of friction of the road surface signal Mu;

summing said reference brake pressure feedforward value, said reference wheel spin feedforward value, said reference driven wheel spin feedforward value, said hill slope of the road surface signal, and said coefficient of friction of the road surface signal, to generate a first feedforward value F;

summing said first feedback signal $Pb$ and said reference vehicle brake pressure signal $Pb_r$ to produce a first sum and applying said first sum to a first gain $G_1$ to generate a brake pressure error value;

summing said second feedback signal $e$ and said reference wheel spin error signal $e_r$ to produce a second sum and applying said second sum to a second gain $G_2$ to generate a wheel spin error value;

summing said third feedback signal $w$ and said reference driven wheel speed signal $w_r$ to produce a third sum and applying said third sum to a third gain $G_3$ to generate a driven wheel speed error value;

summing said brake pressure error value, said wheel spin error value, said driven wheel speed error value, and said first feedforward value F to generate an optimum brake pressure value BP; and controlling the level of vehicle braking in response to said optimum brake pressure value BP.

10. A brake pressure control method for a vehicle having an engine, wheels, an axle, a throttle, and brakes, the vehicle being driven on a road surface having a coefficient of friction and at least one hill slope, comprising;

means for generating a first disturbance value related to the slope of the hill;

means for generating a second disturbance value related to the coefficient of friction of the road surface;

means for summing said first and second disturbance values to produce a feedforward control value; and means for controlling the level of vehicle braking in response to said feedforward control value.

11. A brake pressure control system for a vehicle as claimed in claim 10 wherein said means for generating a first disturbance value comprises a hill slope estimator.

12. A brake pressure control system for a vehicle as claimed in claim 10 wherein said means for generating a second disturbance value comprises a road surface coefficient of friction estimator.

13. A brake pressure control method for a vehicle having an engine, wheels, an axle, a throttle, and brakes, the vehicle being driven on a road surface having a coefficient of friction and at least one hill slope, comprising;

means for generating a first disturbance value related to the slope of the hill;

means for generating a second disturbance value related to the coefficient of friction of the road surface;

means for generating reference feedforward gains;

means for summing said first and second disturbance values and said reference feedforward gains to generate produce a feedforward control value;

means for generating error values relating to driven wheel speed, wheel spin, and brake pressure;

means for summing said feedforward control value and said error values to generate produce an optimum brake pressure value; and means for controlling the level of vehicle braking in response to said optimum brake pressure value.

14. A brake pressure control method for a vehicle having an engine, wheels, an axle, a throttle, and brakes, the vehicle being driven on a road surface having a coefficient of friction and at least one hill slope comprising:

means for measuring vehicle brake pressure to generate a first feedback signal;

means for measuring wheel spin error of driven wheel to generate a second feedback signal;

means for measuring driven wheel speed to generate a third feedback signal;

means for determining a reference vehicle brake pressure signal for generating a reference brake pressure feedforward value;

means for determining a reference wheel spin error signal for generating a reference wheel spin feedforward value;

means for determining a reference wheel speed signal for generating a reference driven wheel spin feedforward value;

means for estimating a hill slope of the road surface from a first disturbance signal to generate a first disturbance value;

means for estimating a coefficient of friction of the road surface value from a second disturbance signal to generate a second disturbance value;

means for summing said reference brake pressure feedforward value, said reference wheel spin feedforward value, said reference driven wheel spin feedforward value, said first disturbance value, and said second disturbance value, to generate a first feedforward value;

means for summing said first feedback signal and said reference vehicle brake pressure signal to produce a first sum and applying said first sum to a first gain to generate a brake pressure error value;

means for summing said second feedback signal and said reference wheel spin error signal to produce a second sum and applying said second sum to a second gain to generate a wheel spin error value;

means for summing said third feedback signal and said reference driven wheel speed signal to produce a third sum and applying said third sum to a third gain to generate a driven wheel speed error value;

means for summing said brake pressure error value, said wheel spin error value, said driven wheel speed error value, and said first feedforward value to generate produce an optimum brake pressure value; and means for controlling the level of vehicle braking in response to said optimum brake pressure value.

15. A brake pressure control method for a vehicle having an engine, wheels, tires, an axle, a throttle, and brakes, the vehicle being driven on a road surface having a coefficient of friction and at least one hill slope, the system comprising:

means for generating a first disturbance value related to the slope of a hill;

means for generating a second disturbance value related tot he coefficient of friction of the road surface;

a summer for summing said first and second disturbance values to generate produce an optimum brake pressure value; and a means for controlling the level of vehicle braking in response to said optimum brake pressure value to regulate the vehicle tire skid.

16. A brake pressure control system for a vehicle as claimed in claim 15 wherein said means for generating a first disturbance value comprises a hill slope estimator.

17. A brake pressure control system for a vehicle as claimed in claim 15 wherein said means for generating a second disturbance value comprises a road surface coefficient of friction estimator.

* * * * *